(12) United States Patent
Hawkins et al.

(10) Patent No.: US 9,243,685 B2
(45) Date of Patent: Jan. 26, 2016

(54) NOISE REDUCTION DEVICE

(75) Inventors: Ray Russell Hawkins, Frankston (AU); Toan Quac Dang, Richmond (AU)

(73) Assignee: Automatic Technology (Australia) Pty. Ltd., Keysborough (AU)

( * ) Notice: Subject to any disclaimer, the term of this patent is extended or adjusted under 35 U.S.C. 154(b) by 955 days.

(21) Appl. No.: 12/106,142

(22) Filed: Apr. 18, 2008

(65) Prior Publication Data

US 2009/0260291 A1  Oct. 22, 2009

(51) Int. Cl.
  F16G 13/02   (2006.01)
  B65G 39/16   (2006.01)
  F16G 13/18   (2006.01)

(52) U.S. Cl.
  CPC ..................... F16G 13/18 (2013.01)

(58) Field of Classification Search
  CPC ............ F16G 13/04; F16G 5/18; F16H 7/06; B62D 55/0845
  USPC ......... 474/201–236, 161; 299/82.1; 98/860.3, 98/860.5
  See application file for complete search history.

(56) References Cited

U.S. PATENT DOCUMENTS

| | | | | | |
|---|---|---|---|---|---|
| 575,718 | A | * | 1/1897 | Kammerer | 474/218 |
| 1,476,603 | A | * | 12/1923 | Firminger | 474/245 |
| 2,344,750 | A | * | 3/1944 | Stoltz | 299/82.1 |
| 3,089,346 | A | * | 5/1963 | Dittrich et al. | 474/242 |
| 3,188,795 | A | * | 6/1965 | Ulm | 59/91 |
| 3,515,013 | A | * | 6/1970 | Wykes | 474/145 |
| 3,586,393 | A | * | 6/1971 | Myers | 305/160 |
| 4,297,839 | A | * | 11/1981 | Gurney | 59/85 |
| 4,344,761 | A | * | 8/1982 | Steuer | 474/245 |
| 4,464,152 | A | * | 8/1984 | Kern | 474/245 |
| 4,618,338 | A | * | 10/1986 | Rattunde et al. | 474/245 |
| 4,690,665 | A | * | 9/1987 | Oliver et al. | 474/245 |
| 4,854,924 | A | * | 8/1989 | Nagano | 474/140 |
| 5,042,244 | A | * | 8/1991 | Worsley | 59/78 |
| 5,052,985 | A | * | 10/1991 | Masuda et al. | 474/245 |
| 6,106,425 | A | * | 8/2000 | Mott | 474/219 |
| 6,945,388 | B2 | | 9/2005 | Schumacher | |
| 6,978,595 | B2 | * | 12/2005 | Mendenhall et al. | 59/78.1 |
| 7,310,936 | B2 | * | 12/2007 | Saiki et al. | 59/78.1 |
| 7,546,726 | B1 | * | 6/2009 | Wu | 59/78 |
| 2003/0024231 | A1 | | 2/2003 | Blase | |
| 2005/0037881 | A1 | * | 2/2005 | Wehler et al. | 474/206 |
| 2008/0026896 | A1 | * | 1/2008 | Curran | 474/206 |

OTHER PUBLICATIONS

Patent Examination Report No. 1, dated May 28, 2014, Patent Application No. 2008201482, Automatic Technology (Australia) Pty Ltd.

* cited by examiner

*Primary Examiner* — William E Dondero
*Assistant Examiner* — Minh Truong
(74) *Attorney, Agent, or Firm* — Taylor English Duma, LLP

(57) ABSTRACT

The invention relates to a noise reduction device. More particularly, the present invention relates to a device that is suitable for use with a drive chain, for reducing noise and vibration resulting from the chain contacting its surrounding environment (rattle noise). The present invention has particular but not exclusive application in reducing noise in chains installed as part of powered door assemblies. In one form, the invention provides a noise reduction device suitable for use with a chain comprising a plurality of connected links, the device adapted for attachment to a link, such that when attached, the member is fixed to and movable with the link and presents one or more surfaces to an environment surrounding the chain, the or each surface provided with damping means to reduce noise associated with the chain contacting the surrounding environment.

2 Claims, 5 Drawing Sheets

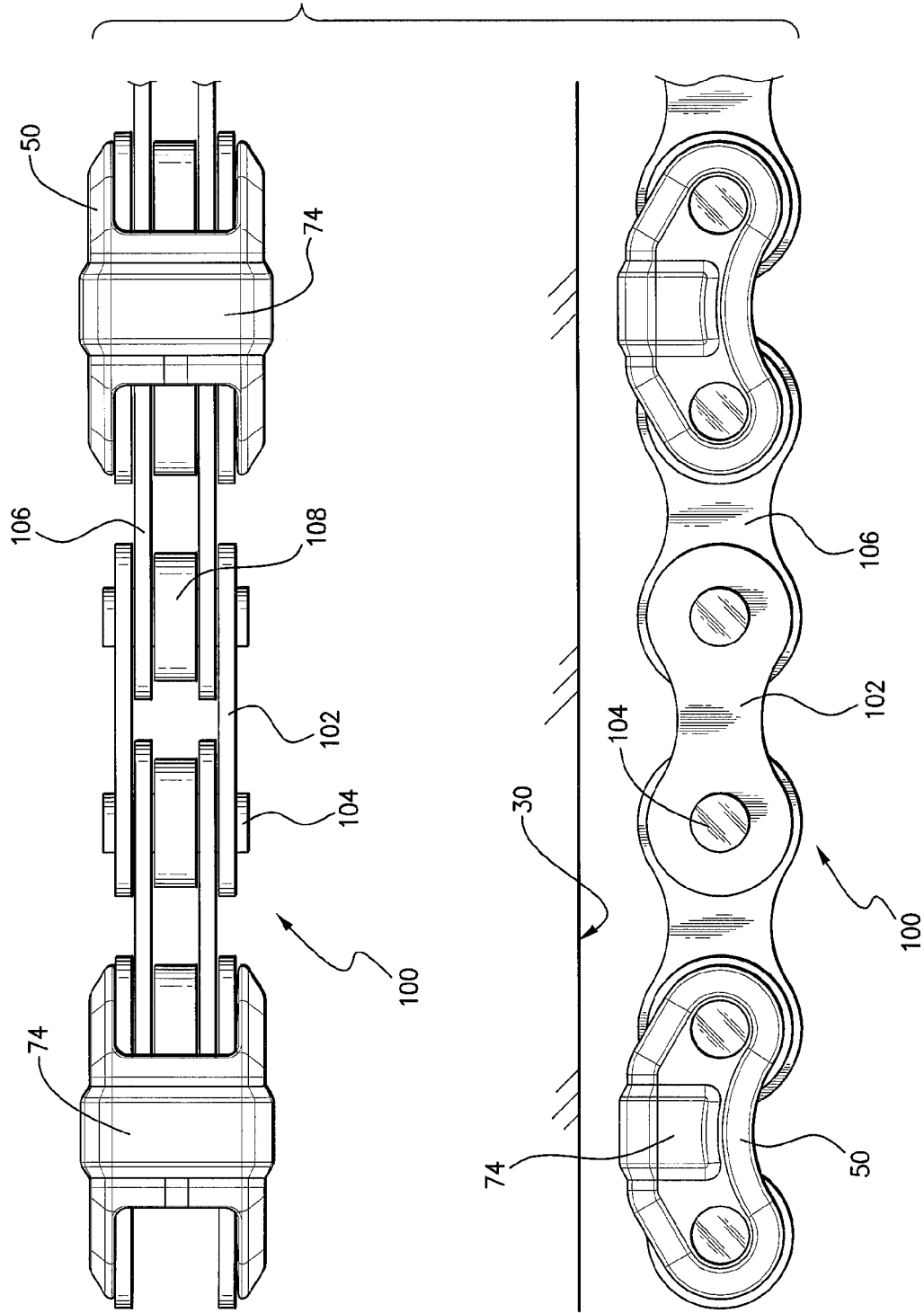

NOISE REDUCTION DEVICE

FIELD OF THE INVENTION

The invention relates to a noise reduction device. More particularly, the present invention relates to a device that is suitable for use with a drive chain, for reducing noise and vibration resulting from the chain contacting its surrounding environment (rattle noise). The present invention has particular but not exclusive application in reducing noise in chains installed as part of powered door assemblies.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

A typical known powered door assembly is illustrated in FIG. 1, which shows a sectional garage door 10 comprising an articulated series of linked panels (in this example, four) arranged to be guided by edge rollers running in lateral guiding and support tracks 12, between a closed vertical position (as shown) and an open, overhead horizontal position.

Remote-controlled operator device 14 comprises an electronically controlled electric motor drive to operate door 10 by way of door arm 16, hingedly connected to door 10. Operator 14 drives door arm 16 by means of a drive sprocket engaging with a chain 100 which moves a drive trolley 18 along an overhead longitudinal track 20. Track 20 is mounted by way of a header 22 to the wall above the garage door opening, and an idler sprocket (not shown) is mounted at the header end 22 of track 20. Trolley 18 can therefore be moved in both directions thereby to open and close door 10. An emergency release handle 24 is provided, attached by way of a cord to trolley 18 to allow selective disengagement of the trolley from the chain, in order to manually operate the door in the event of power failure, etc. Chain 100 thus forms a closed loop mounted for travel in a horizontal plane, as shown in FIG. 1A, which illustrates the use of a C-section track or channel 20 partially enclosing the chain and configured to support and guide trolley 18.

Chain 100 is supported by the drive and idler sprocket with which it engages, and a degree of sag in the chain is unavoidable. Consequently, and particularly during acceleration and deceleration, chain 100 has a tendency to come into contact with the walls 30 of the longitudinal track 20. Both track 20 and chain 100 are metallic and therefore a significant amount of noise and vibration can be generated when contact occurs. In alternative assemblies, employing a central longitudinal metal rail (in place of a partially closed track) along which the trolley runs, the chain can come into contact with the sides of the rail, also giving rise to noise and vibration problems.

Such chain noise can be unacceptable in some residential installations, particularly if close to adjoining bedrooms, living rooms, etc. Door manufacturers have in the past accordingly attempted to minimise the occurrence of noise in a number of ways. Toothed rubber drive belts can be used in place of metal chains, which are significantly quieter in operation. However, such belts are generally considerably more expensive than chains, and this solution is therefore not appropriate in all situations.

US patent application Ser. No. 2007/0283627 proposes the use of vibration damping pads for use between a garage wall adjacent the garage door and a track support, which can assist in reducing the transfer of vibration and noise to the building itself. However, this approach does not tackle the problem of the generation of noise.

Some manufacturers and installers have in the past applied adhesive noise reduction pads at regularly spaced positions along the inner walls of the track. The pads can assist in minimising the risk of metal-to-metal contact and thus reducing the noise generated. However, this solution has also not been wholly successful, as such pads can be worn down or worn off over time. Moreover, it can be difficult to access the interior wall of the rail to install or replace the pads, particularly when the chain is in place.

The present invention sets out to achieve an improved, or at least an alternative, solution to this problem.

SUMMARY OF THE INVENTION

According to a first aspect of the present invention there is provided a noise reduction device suitable for use with a chain comprising a plurality of connected links, the device adapted for attachment to a link, such that when attached, the member is fixed to and movable with the link and presents one or more surfaces to an environment surrounding the chain, the or each surface provided with damping means to reduce noise associated with the chain contacting the surrounding environment.

It will be appreciated that, in contrast to previous approaches to the chain noise problem, it is a simple matter to attach the device of the invention to a chain, even when the chain is installed in a track.

The device of the invention may be attachable to a chain link in any suitable manner, provided that once attached, the device does not provide undesirable restriction to the movement of the chain, and particularly to the relative articulation between the links and to the interaction of the chain with the sprockets with which it engages. In a preferred embodiment, the device is for use with a chain comprising a plurality of pivotally connected links interconnected by link pins, and includes means to cooperate with a link pin for attachment of the device to the link.

The cooperation means may comprise recesses or apertures configured to locate over the ends of two adjacent link pins. Preferably, the cooperation means are located at or adjacent each end of the device, positioned and configured to cooperate with the two pins connecting the link to its two neighbouring links.

The device is preferably for use with a chain comprising links made up of link plates connected by the link pins, the device comprising:
a web; and
first and second flanges, substantially parallel to one another and extending from opposed ends of the web, shaped and configured such that the device can be clipped over a chain link, the flanges locating against or adjacent the link plates, the resilience of the web acting to hold the device in place.

The device may therefore take the form of a clip, engageable with the chain by being slipped from a lateral direction onto a chain link, so to at least partially cover one side of the link and two opposed link plate surfaces. The device therefore leaves uncovered the second side of the link, so avoiding any interference with the teeth of sprockets with which the chain engages.

In particular, then, the device of the invention is for use with a 'bicycle-type' chain, comprising symmetrical links, the chain supported only by the sprockets with which it engages. Bach link is generally of no more than about 20 mm in length. It will be appreciated that the device can be introduced onto a link from either side of the chain.

The damping means may be provided in any appropriate manner. The damping means preferably comprises a portion of sound-damping material providing a facing to at least one of the surfaces of the device. Any suitable sound-damping material may be used with the present invention. Preferably, the sound-damping material is a rubber-based material, such as natural or synthetic rubber.

As the sound-damping material provides a facing to at least part of the device, contact between the chain and the surrounding environment where the device is fitted will be via the sound-damping material, thereby reducing or eliminating noise which may otherwise result from direct contact between the chain and surrounding environment.

The portion of sound-damping material may be provided by a strip extending around at least a part of the web and the flanges of the device.

For use with a chain arranged to run in an orientation in which the link pins are substantially vertical, the sound-damping material may be arranged to provide a facing to at least one side of the chain and to the top and/or bottom of the chain.

According to a second aspect of the present invention there is provided a powered door or gate assembly comprising:
a rail or track;
a chain loop comprising a plurality of connected links, mountable to run along or within the track or rail; and
means for driving the chain to move a door operatively connected to the chain between an open and a closed position, the chain provided with one or more of the above-defined devices, in order to reduce noise which may result from the chain contacting the rail or track.

BRIEF DESCRIPTION OF THE DRAWINGS

A preferred embodiment of the present invention is now illustrated by reference to the accompanying drawings in which:

FIG. 7 shows a plan and elevation view of a two of the devices of FIG. 2 clipped in place on the drive chain of FIG. 1A.

DETAILED DESCRIPTION OF THE DRAWINGS

Figure 1:
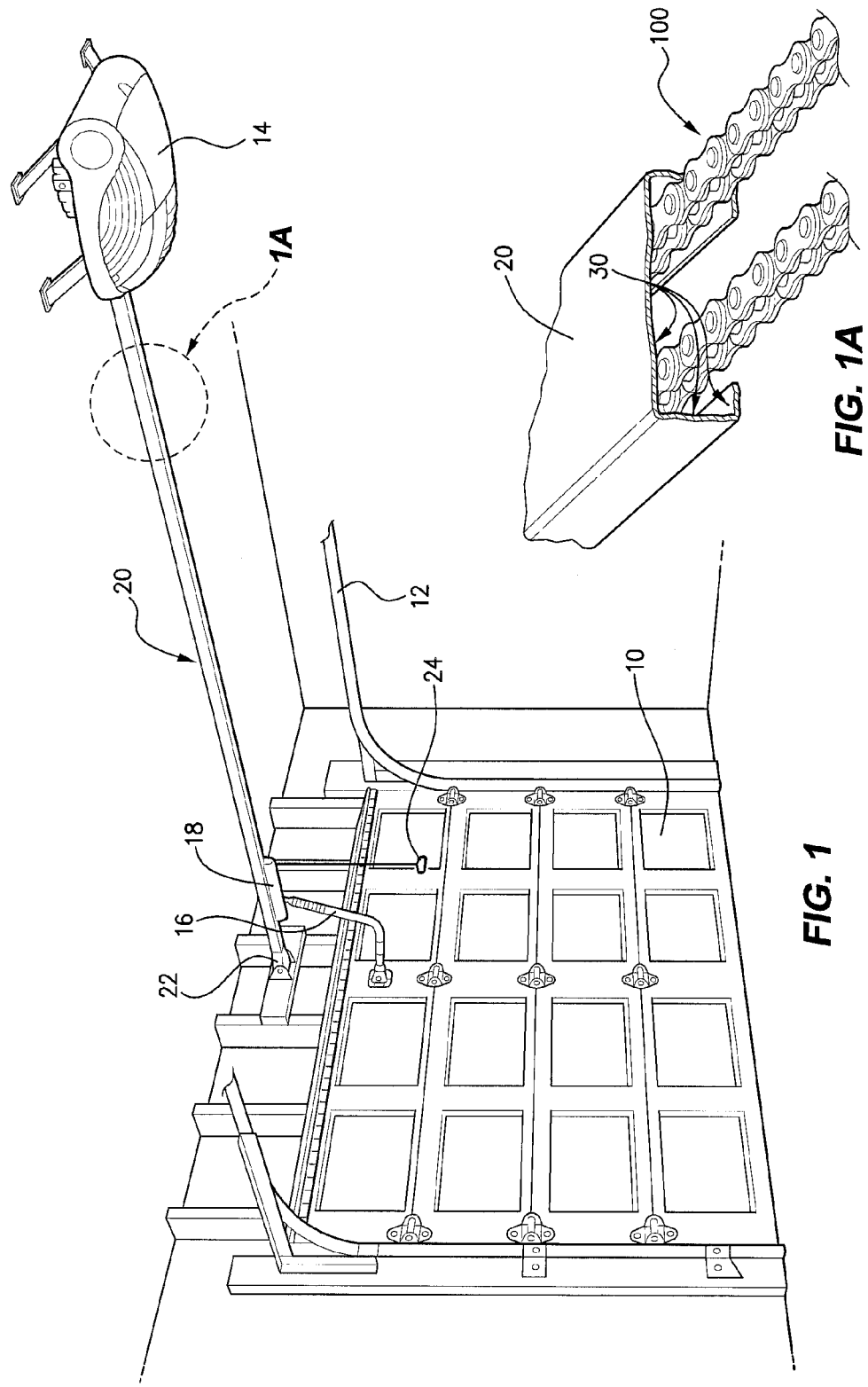
FIG. 1 is an illustration of a typical powered garage door assembly, including a blown-up view of the chain and track in FIG. 1A.
Figure 2:
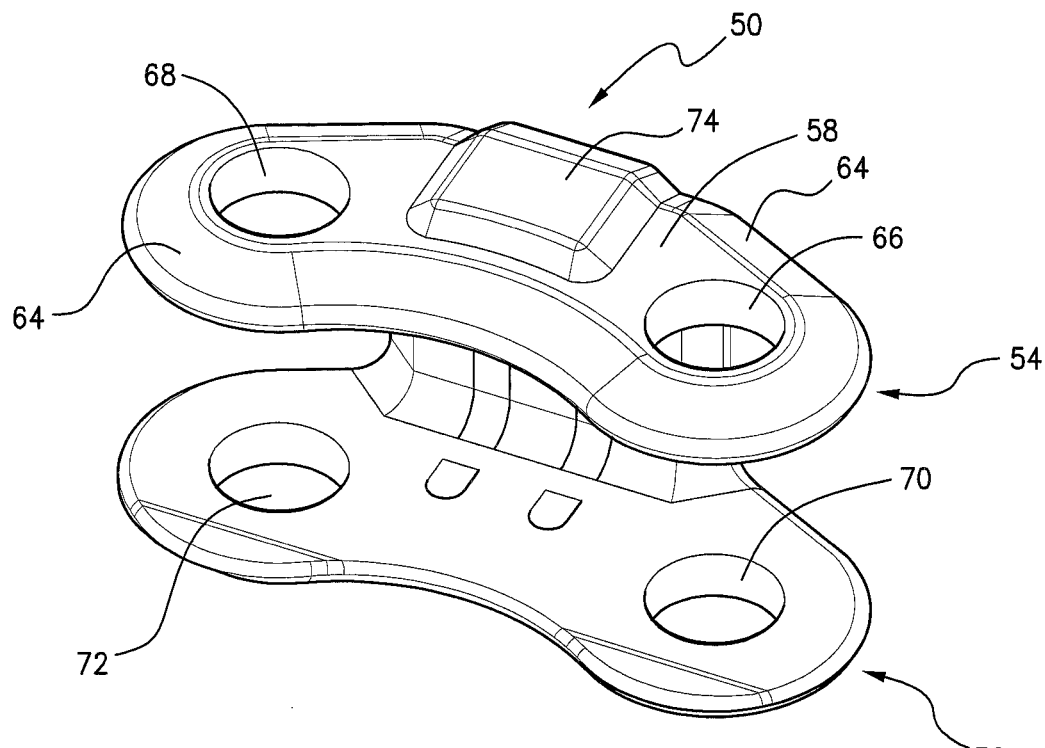
FIG. 2 is a perspective view of a noise-reduction device in accordance with the invention.

An embodiment of a noise reduction device 50 according to the present invention is illustrated in FIGS. 2 to 7. The device 50, in broad terms, takes the form of a light-weight and easily manipulable clip. As described in detail below, a plurality of clips 50 may be conveniently attached to a drive chain 100 at spaced locations so as to reduce the resulting noise if the chain assembly should contact its surrounding environment.

Clip 50 is manufactured from a material of suitable resilience, preferably plastic, and comprises a substantially planar web portion 52, from which a first 54 and a second 56 planar flange extend perpendicularly. As clearly seen in FIG. 4, each flange 54, 56 is roughly 'boomerang' shaped, comprising a generally rectangular central region 58 and first 60 and second 62 round-cornered wing portions extending from either side of central region 58.

A chamfered skirt portion 64 extends around the periphery of each flange 54, 56 as shown, extending from planar region 58 to the edges of the flanges.

Apertures 66, 68, 70 and 72 are provided near the opposed ends of each flange 54, 56. Respective apertures 66, 70 and 68, 72 on the flanges lie co-axial to each other, as shown.

Figure 3:
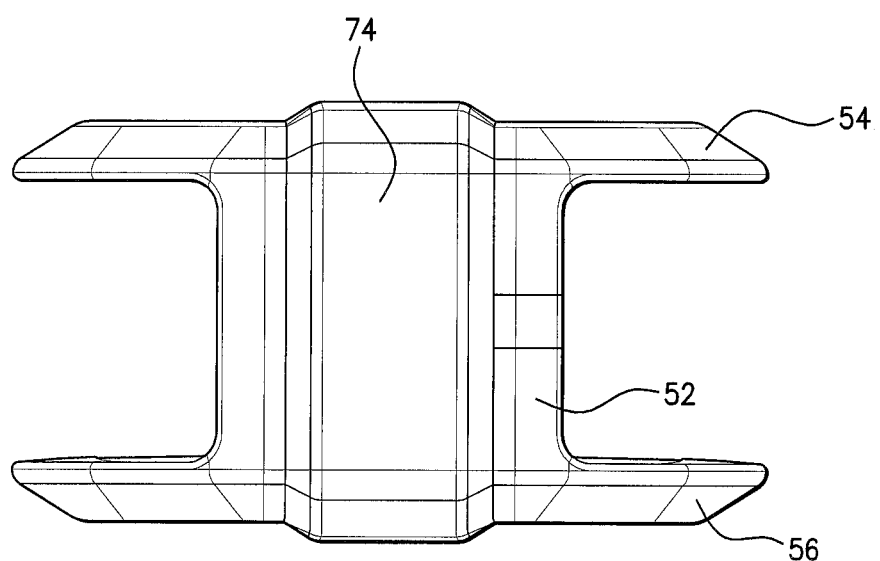
FIG. 3 is a plan view of the device of FIG. 2.
Figure 4:
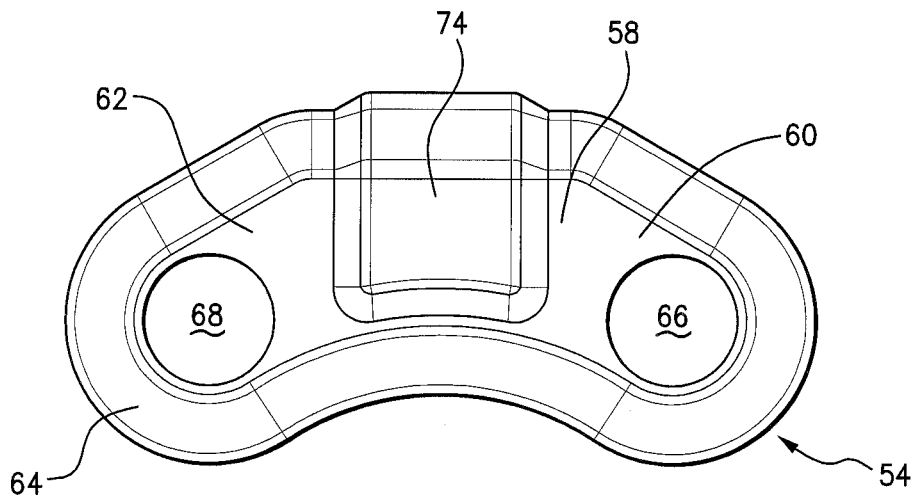
FIG. 4 is an elevation view of the device of FIG. 2.
Figure 5:
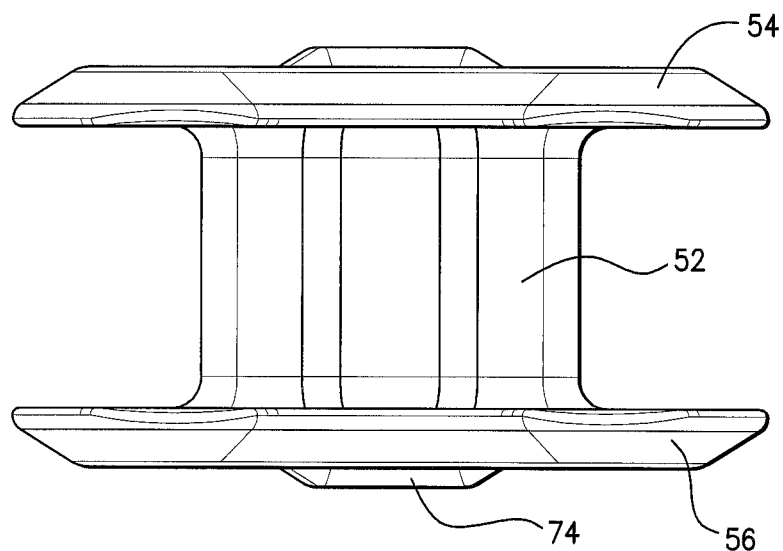
FIG. 5 is a bottom plan view of the device of FIG. 2.
Figure 6:
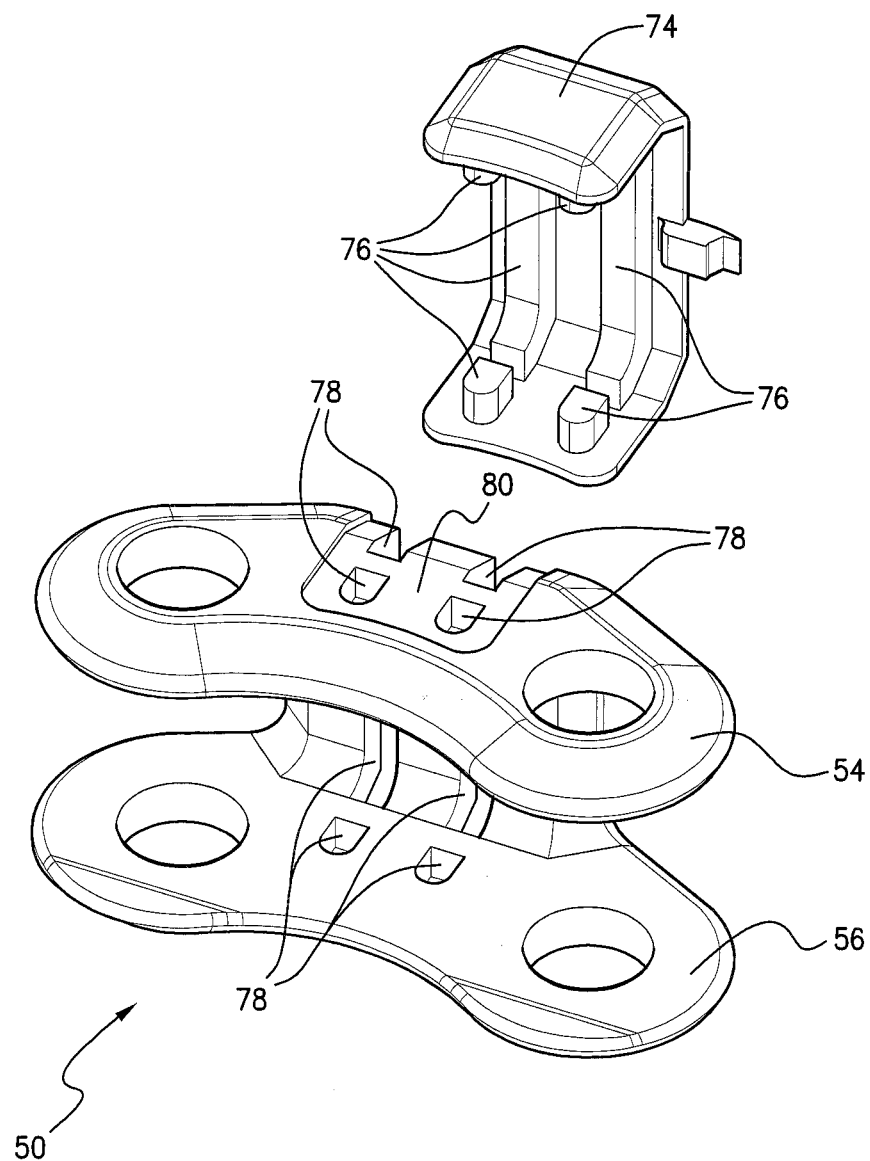
FIG. 6 is an exploded view of the device of FIG. 2.

The material of clip 50 thus provides the required resilience of the device to be able to clip securely but releasably over a chain link. As FIG. 3 shows, flanges 54, 56 extend considerably further in the longitudinal direction than does web portion 52. This ensures (see below) that there is no risk of the neighbouring links (ie. those adjacent to that to which the clip is secured) coming into contact with clip 50 and affecting the articulation of the chain.

A C-shaped strip 74 of rubber material (FIG. 6) is firmly mounted to clip 50 by way of projections 76 provided as shown on the inner face of strip 74 and complementary indentations 78 formed in a recessed area 80 of the central region 58 of each flange 54, 56 and of web 52. Additionally or alternatively, rubber strip 74 may be adhered in position to clip 50.

Strip 74 is of a thickness so to extend out of the plane of the web 52 and flanges 54, 56.

Clips 50 are dimensioned to be fitted into place, from the outer side of the chain when in position, over single links of chain 100. Inner faces of flanges 54, 56 are separated by a spacing approximately equal to the separation of the outer faces of chain outer link plates 102, while coaxial apertures 66 and 70 are separated from coaxial apertures 68 and 72 by a distance equal to the longitudinal spacing between subsequent chain link pins 104 (FIG. 7). In use, a plurality of clips 50 are clipped onto the chain 100 at selected locations, such as regularly spaced by a certain number of chain links. The spacing is selected as required for optimum noise damping in the particular application, for example as determined by the installer. By manually slightly separating flanges 54 and 56, each clip can be clipped easily onto a chain link by easing it over the outer link plates 102 and locating the apertures 66, 68 of one flange 54 over the end of two adjacent chain pins 104 on a first side of the chain 100, and locating apertures 70, 72 of the other flange 56 over the end of those pins 104 on the other side of the chain. The resilience of the clip holds it firmly in position against the pair of outer link plates 102, and as is clear from FIG. 7 each clip fits closely against its respective chain link and moves integrally with that link, causing no possibility of interference with the motion of the chain, as it cannot impede relative movement of inner link plates 106 or adjacent links, nor can it impede the engagement of the link rollers 108 with the teeth of the sprockets with which the chain engages.

As clearly shown in FIG. 7, the outer faces of strip 74 presents a surface which projects beyond the outer surfaces of the chain, both on the outer side and on the upper and lower sides of the chain. The result of this is that any contact between with the walls 30 of track 20, at least in the part of the chain where the devices are positioned, will be by way of rubber strip 74, thus minimising or eliminating the impact and noise of such contact.

In a form of the invention tested by the present applicant, chain clip 50 was manufactured from a Nylon 66 plastics material Zytel 101™(DuPont), and rubber strip 74 from a thermoplastic elastomer (TPE) TekBond™ 60 (Teknor Apex). The plastic and rubber were moulded together in the same tool. The separation of the clip apertures (ie. the chain interpin distance) was 13 mm.

The clip of the invention can be readily attached to the chain before the chain is installed in the track. It is also a simple matter to replace clips, to add further clips, or to change the clip positions with the chain in place in the track, if necessary by first loosening the chain by way of the chain tensioner provided in such assemblies.

The word 'comprising' and forms of the word 'comprising' as used in this description and in the claims do not limit the invention claimed to exclude any variants or additions, Modifications and improvements to the invention will be readily apparent to those skilled in the art. Such modifications and improvements are intended to be within the scope of this invention.

What is claimed is:

1. A chain assembly moveable within a track mounted to a garage ceiling, comprising:

a chain having a plurality of pairs of outer link plates and inner link plates defining chain links, each pair of outer link plates interconnected to first and second pairs of inner link plates, each pair of outer link plates comprising a first outer link plate and a second outer link plate spaced from the first outer link plate, each outer link plate having a first end and a second end and defining an outer link plate first aperture near the first end and an outer link plate second aperture near the second end, the first pair of inner link plates having a first inner link plate and a second inner link plate spaced from the first inner link plate, the second pair of inner link plates having a third inner link plate and a fourth inner link plate spaced from the third inner link plate, each inner link plate defining an inner link plate aperture, the chain having a plurality of link rollers and link pins extending through the link plate apertures, each link pin having opposed ends such that for each pair of outer link plates, one pin extends through the outer link plate first aperture of the first outer link plate, through the inner link plate aperture of the first inner link plate, through a link roller of the plurality of link rollers, through the inner link plate aperture of the second inner link plate, and through the outer link plate first aperture of the second outer link plate, and another pin extends through the outer link plate second aperture of the first outer link plate through the inner link plate aperture of the third inner link plate, through another link roller of the plurality of link rollers, through the inner link plate aperture of the fourth inner link plate, and through the outer link plate second aperture of the second outer link plate, whereby each chain link is connected to two neighboring chain links by two respective link pins;

a clip removably and resiliently attached to a single chain link of the chain, the clip having first and second flange portions, each flange portion having a central region, the central region having two sides, a front edge and a rear edge, and a recessed surface into which an indentation is formed, a first wing portion extending from one side of the central region and a second wing portion extending from another side of the central region, the first wing portion terminating in a first wing edge and the second wing portion terminating in a second wing edge, the front edge, rear edge, first wing edge, and second wing edge defining a periphery, each flange portion also having a chamfered skirt extending around its periphery and a wing aperture formed therethrough near each wing edge, each wing aperture having a center, with centers of the first wing_apertures in the first and second flange portions being substantially axially aligned, and the centers of the second wing apertures in the first and second flange portions being substantially axially aligned, such that each pair of axially-aligned apertures is substantially coaxial with a link pin extending though the outer link plates, and such that a link pin end extends though each flange aperture; and a C-shaped strip of elastomeric material mounted to the clip, the strip having opposed ends, an inner surface, and a projection extending outwardly from the inner surface near each end, one projection fitting into the indentation in the first flange portion of the clip, and the other projection fitting into the indentation in the second flange portion of the clip;

wherein the strip reduces noise associated with movement of the chain within the track by providing one damping face on at least one side of the chain and one damping face on the top and/or bottom of the chain.

2. The chain assembly of claim 1, wherein the strip is removably attached to said clip to provide said damping faces.

* * * * *